United States Patent
Kimmel et al.

(10) Patent No.: US 6,882,449 B2
(45) Date of Patent: Apr. 19, 2005

(54) SPACE VARYING GAMUT MAPPING

(75) Inventors: Ron Kimmel, Haifa (IL); Doron Shaked, Haifa (IL); Michael Elad, Haifa (IL); Irwin Sobel, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 09/882,038

(22) Filed: Jun. 18, 2001

(65) Prior Publication Data

US 2003/0030826 A1 Feb. 13, 2003

(51) Int. Cl.⁷ ............................................. H04N 1/60
(52) U.S. Cl. .................. 358/1.9; 358/518; 382/167
(58) Field of Search .................. 358/1.9, 518; 382/167, 382/254

(56) References Cited

U.S. PATENT DOCUMENTS

| 6,198,843 B1 | | 3/2001 | Nakauchi et al. ........... 382/167 |
|---|---|---|---|
| 6,360,022 B1 | * | 3/2002 | Lubin et al. ................. 382/260 |
| 6,437,792 B1 | * | 8/2002 | Ito et al. ...................... 345/600 |
| 6,646,762 B1 | * | 11/2003 | Balasubramanian et al. . 358/1.9 |
| 6,731,790 B1 | * | 5/2004 | Van de Velde et al. ...... 382/162 |
| 2002/0122044 A1 | * | 9/2002 | Deering ....................... 345/597 |
| 2003/0012448 A1 | * | 1/2003 | Kimmel et al. ............. 382/274 |
| 2003/0030826 A1 | * | 2/2003 | Kimmel et al. ............. 358/1.9 |
| 2003/0174884 A1 | * | 9/2003 | Levy et al. .................. 382/167 |
| 2003/0174885 A1 | * | 9/2003 | Levy et al. .................. 382/167 |

FOREIGN PATENT DOCUMENTS

JP          10191090      *  7/1998    ............ H04N/1/60

OTHER PUBLICATIONS

S. Nakauchi; "Color Gamut Mapping by Minimizing Perceptual Differences between Images"; Sep. Sustems and Computers in Japan vol. 29, No. 10 1998 pp. 46–55.

* cited by examiner

Primary Examiner—Scott A. Rogers

(57) ABSTRACT

A method an apparatus uses a variational approach for space dependent gamut mapping. The method presents a new measure for the problem. A solution to the formulation according to the method is unique if the gamut of the target device is known. A quadratic programming efficient numerical solution provides real-time results.

23 Claims, 10 Drawing Sheets

SPACE VARYING GAMUT MAPPING

TECHNICAL FIELD

The technical field is color image processing using gamut correction.

BACKGROUND

Gamut mapping is a method used to modify a representation of a color image to fit into a constrained color space of a given rendering medium. A laser-jet color printer that attempts to reproduce a color image on regular paper would have to map the photographed picture colors in a given color range, also known as the image "color gamut," into the given printer/page color gamut. Conventional gamut mapping methods involve a pixel by pixel mapping (usually a pre-defined look-up table) and ignore the spatial color configuration. More recently, spatial dependent approaches were proposed for gamut mapping. However, these solutions are either based on heurestic assumptions or involve a high computational cost. An example of such a method is discussed in "Color Gamut Mapping Based on a Perceptual Image Difference Measure," S. Nakauchi, et al., *Color Research and Application*, Vol. 24, pp. 280–291 (1999).

Another method relies on preserving the magnitude of gradients in an original image, while projecting the gradients onto the target gamut as a constraint. This multi-scale property is achieved by sampling the image around each pixel with exponentially increasing sampling intervals while the sampling is done along vertical and horizontal axes. The method involves modulating an $L_2$ measure for image difference by human contrast sensitivity functions. The method uses a model in which the contrast sensitivity function is a linear combination of three spatial band-pass filters $H_1$, $H_2$, $H_3$, given in the spatial-frequency domain (or $h_1$, $h_2$, $h_3$, as their corresponding spatial filters), as shown in FIG. 1.

For gamut mapping of the image $u_0$ in the CIELAB (which stands for Commission International de l'Eclairage (CIE) with L, A, and B (more commonly L, a, b) respectively representing converted signals for cyan (C), magenta (M) and yellow (Y)) space, the method minimizes the functional $$E(u^L, u^a, u^b) = \sum_{i=1}^{3} \sum_{c \in \{L,a,b\}} \int_{\Omega} (h_i^c * (u^c - u_0^c))^2 d\Omega, \quad (1)$$

subject to $\{u^L, u^a, u^b\} \in \vartheta$.

In Equation (1), $h_1^c$ is the filter corresponding to the spectral channel $c \in \{L, a, b\}$ the $i \in \{1, 2, 3\}$ 'contrast sensitivity' mod, $\Omega$ is the image domain, and $\vartheta$ is the target gamut. Note that a total of nine filters $H_1^c$ are involved, three for each spectral channel and a total of three spectral channels.

The filters $H^c$, are modeled by Gaussians shifted in the spatial frequency domain. $H_1^c$ is a special case where the shift is zero. The spread function $h_1^c$ corresponding to $H_1^c$ is the Inverse Fourier Transform of $H_1^c$, and is thus a Gaussian.

As depicted in the first line of FIG. 2 for the case of $H_2^c$ and $H_3^c$, spatial frequency shifts are a convolution with correspondingly shifted delta functions in the spatial frequency domain. The soread functions $h_i^c$, (for i=2, 3) depicted in line 2 of FIG. 2 are the Inverse Fourier Transforms of the corresponding $H_1^c$. As such, they are multiplications of the Inverse Fourier Transforms of the Gaussian and the corresponding shifted delta functions, namely a multiplication of a Gaussian and a harmonic function. As depicted graphically in line 3 of FIG. 2, harmonically modulated Gaussians with different harmonic periods correspond to derivatives at different scales. Thus, the gradient approximation filters $H_2^c$ and $H_3^c$ may be denoted by $\nabla h u$ $c_{\sigma 1, \text{ and }} \nabla_{\sigma 2}$. Note that any band pass filter can be considered as a version of a derivative operator. Furthermore, one possible extension of the 1D derivative to 2D is the gradient. Thus, the minimization of the Equation (1) functional is similar to minimizing the following functional for each channel separately.

$$\int_{\Omega} |h_1^c * (u - u_0)|^2 + |\nabla_{\sigma 1}^c (u - u_0)|^2 + |\nabla_{\sigma 2}^c (u - u_0)|^2 d\Omega \quad (2)$$

Roughly speaking, the first term corresponds to the S-CIELAB perceptual measure, while the next two terms capture the need for matching the image variations at two selected scales that were determined by human perception models. One technical difficulty of the spatial filters corresponding to Equation (1) is their large numerical support.

Another simple spatial-spectral measure for human color perception was proposed in "A Spatial Extension of CIELAB for Digital Color Image Reproduction," Zhang et al., *Proceedings of the SID Symposium*, Vol. 27, pp. 731–34, (1996). The 'S-CIELAB' defines a spatial-spectral measure for human color perception by a composition of spatial band-pass linear filters in the opponent color space followed by the CIELAB Euclidean perceptual color.

SUMMARY

Gamut mapping is a method to modify representation of a color image to fit into a constrained color space of a given rendering medium. A laser-jet color printer that attempts to reproduce a color image on regular paper would have to map the photographed picture colors in a given color range, also known as the image "color gamut," into the given printer/page color gamut.

A method an apparatus uses a variational approach for space dependent gamut mapping. The method presents a new measure for the problem. A solution to the formulation according to the method is unique if the gamut of the target device is known. A quadratic programming efficient numerical solution provides real-time results.

In an embodiment, the method comprises receiving an input image, converting color representations of an image pixel set to produce a corresponding electrical values set, applying a space varying algorithm to the electrical values set to produce a color-mapped value set, and reconverting the color-mapped value set to an output image. The space varying algorithm solves the variational problem, namely, the problem of finding the image "u" that minimizes the following function:

$$E(u) = \int_{\Omega} (D^2 + \alpha |\nabla D|^2) d\Omega x,$$

subject to $u \in \vartheta$, where $\Omega$ is a support of the image, $\alpha$ is a non-negative real number, $D = g*(u-u_0)$, and $g$ is a normalized Gaussian kernel with zero mean and a small variance $\sigma$.

The method may be implemented in a variety of image capture reproduction devices, including cameras and printers. The method may be embodied on a computer-readable medium, such as a CD-ROM, for example.

DESCRIPTION OF THE DRAWINGS

The detailed description will refer to the following drawings, in which like numerals refer to like objects, and in which.

DETAILED DESCRIPTION

Figure 1:
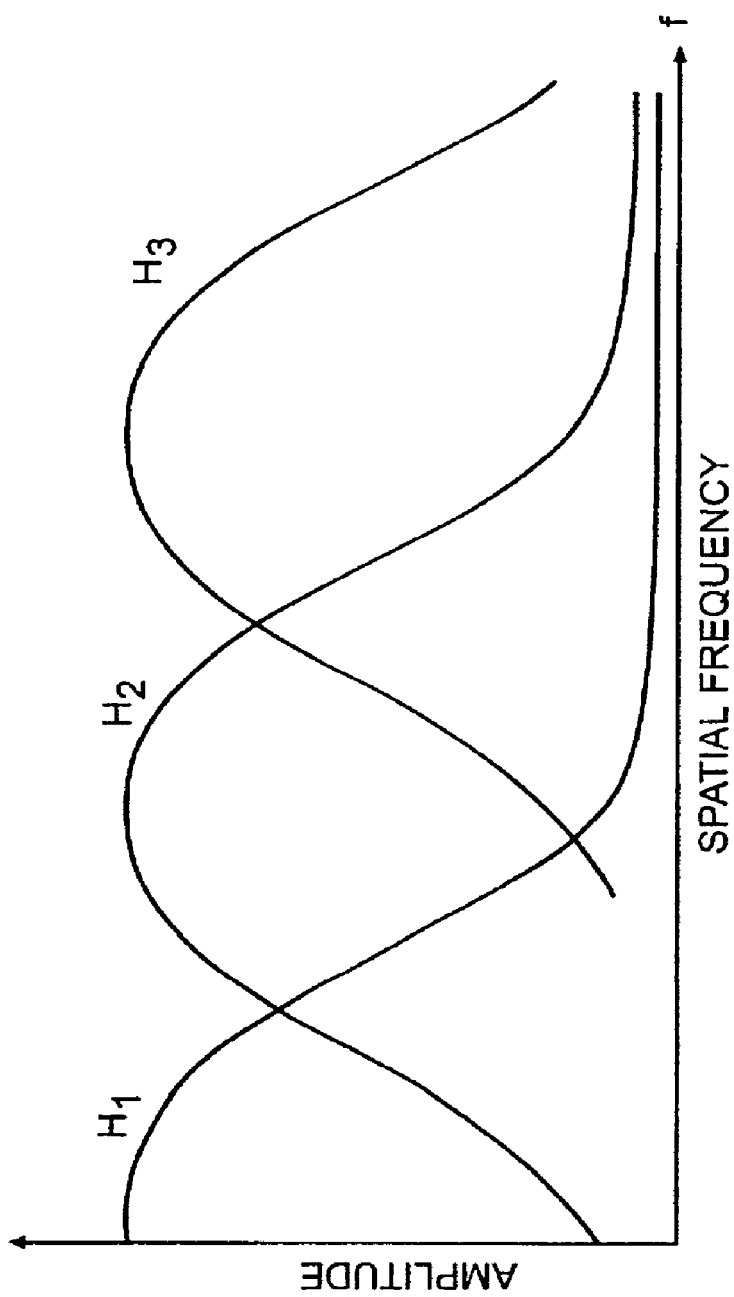
FIG. 1 is a qualitative description of filters modeling the human contrast sensitivity functions in the spectral domain.
Figure 2:
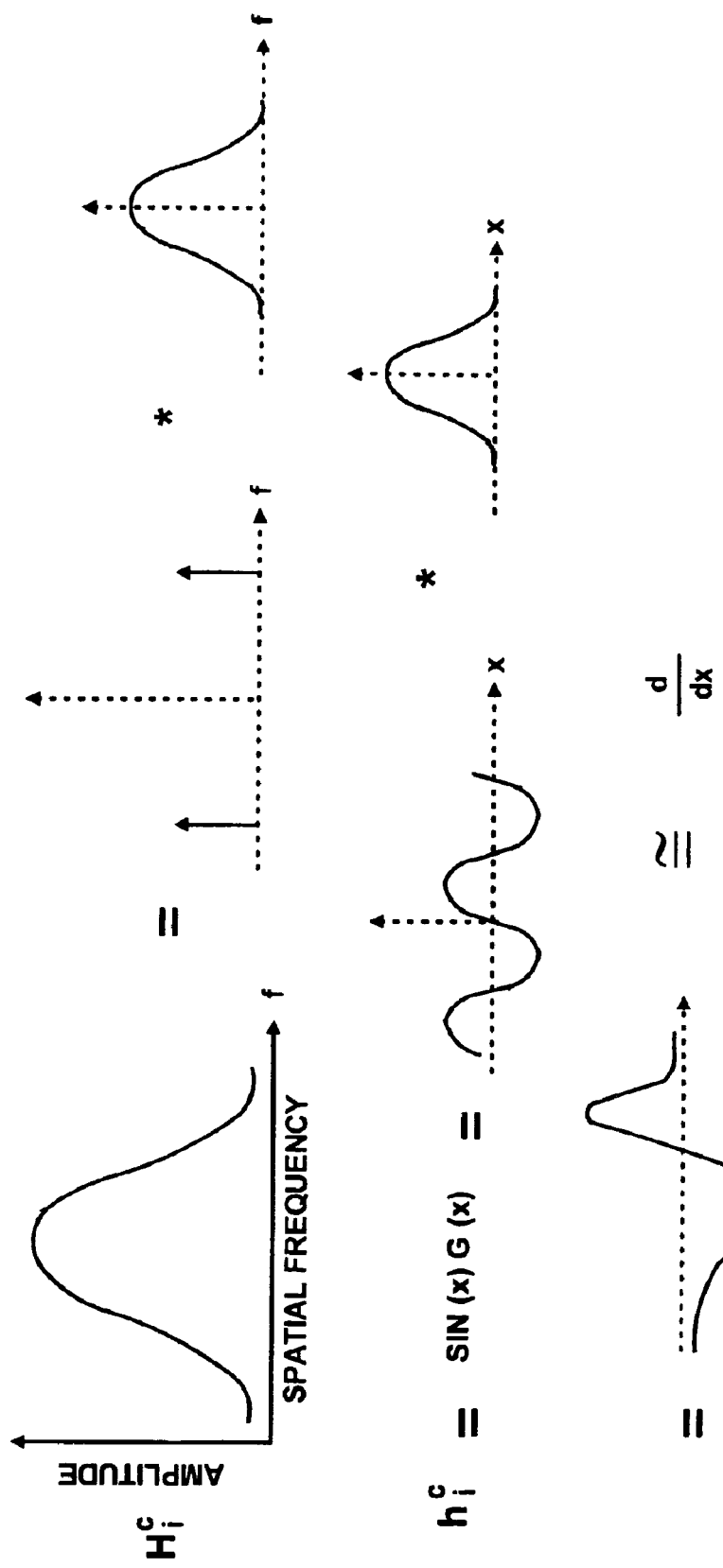
FIG. 2 illustrates a shifted Gaussian.

Gamut mapping is a method used to modify a representation of a color image to fit into a constrained color space of a given rendering medium. A laser-jet color printer that attempts to reproduce a color image on regular paper would have to map the photographed picture colors in a given color range, also known as the image "color gamut," into the given printer/page color gamut. Conventional gamut mapping methods involve a pixel by pixel mapping (usually a pre-defined look-up table) and ignore the spatial color configuration. More recently, spatial dependent approaches were proposed for gamut mapping. However, these solutions are either based on heuristic assumptions or involve a high computational cost.

The gamut mapping problem is related to the Retinex problem of illumination compensation and dynamic range compression. The basic Retinex problem is: How to estimate the reflectance image from the given acquired image? A reasonable optical model of the acquired image S asserts that it is a multiplication of the reflectance R and the illumination L images. Where the reflectance image is a hypothetic image that would have been measured if every visible surface had been illuminated by a unit valued white illumination source, and the illumination image is the actual illumination shaded on surfaces in the scene. In the log domain:

$$s = r + l$$

where s, r, and l are the respective logarithms of S, R, and L. Since surface patches can not reflect more light than has been shaded on them, $R<1 \Rightarrow r<0$. Thus, in an ideal situation, image $r<0$, which is perceptually similar to s. For the Retinex, an additional physically motivated constraint is provided, namely, that the illumination image $l=s-r$ is smooth, i.e. the gradient $|\nabla l|=|\nabla (r-s)|$ is small. But this is just another way to say that the features of r are similar to those of s, since the illumination is assumed not to create perceptual features in s. In the gamut mapping problem an image $u_0$ exists, and the problem is to estimate an image $u \in \vartheta$, which is not only perceptually similar to $u_0$, but also has similar perceptual features as $u_0$.

A good measure of image deviation captures the perceptual difference between the initial, $u_0$ and the final, u, images. This is modeled by $$D = g * (u - u_0). \tag{3}$$

where g may be a normalized Gaussian kernel with zero mean and a small variance σ. This model is good for small deviations. However, for large deviations it should be elaborated to account for possible perceptual feature differences, which may be modeled by the difference of gradients, which due to linearity, turns out to be the gradient of Equation (3)

$$\nabla D = \nabla [g * (u - u_0)] = g * (\nabla u - \nabla u_0) \tag{4}$$

The proposed measure yields the functional $$E(u) = \int_\Omega (D^2 + \alpha |\nabla D|^2) d\Omega, \tag{5}$$

subject to $u \in \vartheta$,
which should be minimized.

Taking a first variation of Equation (5) with respect to u yields the Euler-Lagrange equation:

$$\frac{\delta E(u)}{\delta u} = g * (\alpha div(\nabla g * (u - u_0)) - g * (u - u_0)) = 0, \tag{6}$$

Reformulating Equation (6) as a gradient descent flow for u, provides the following minimization scheme:

$$\begin{cases} \frac{du}{dt} = \alpha g * \Delta D - g * D \\ s.t. \quad u \in \vartheta \end{cases} \tag{7}$$

The functional (Equation (5)) and the resulting minimization scheme are both Euclidean invariant in the image plane. They are thus both translation and rotation invariant. As the parameter α goes to zero, the S-CIELAB model is approximated, while for effective α the result is a proper extension to the perceptual measures, with an efficient numerical implementation.

To provide a numerical solution, recall that an artificial time parameter t was added to the image u(x, y), which now reads u(x, y, t). A first step is to discretize the Euler-Lagrange gradient descent equation, by first taking a simple forward explicit approximation for the t derivative, $$\frac{u^{n+1} - u^n}{\tau} = \alpha g * \Delta D - g * D$$

where $\tau = dt$ and $u^n(x,y) \approx u(x,y; n\tau)$.

Next, the space derivatives are solved. Let $u_{ij}^n \approx u(ih, jh, nt)$, where uniform spatial spacings are assumed in the x and y directions of size h. Using central derivatives in space, $$u_{xx} \approx D_{xx} u \equiv \frac{u_{i+1} - 2u_i + u_{i-1}}{h^2}$$

$$u_x \approx D_x u \equiv \frac{u_{i+1} - u_{i-1}}{2h}$$

and the same for the y direction. Using the relation $g * D_{xx} (g * u) = g_x * g_x * u$, the algorithm next computes the kernels $D_2 = g_x * g_x + g_y * g_y = D_x g * D_x g + D_y g * D_y g$. The explicit approximation reads:

$$\bar{D}^n = g*g*(u^n-u_0)$$

$$L^n = D_2*(u^n-u_0)$$

$$u_{ij}^{n+1} = u_{ij}^n + \tau(\alpha L_{ij}^n - \bar{D}_{ij}^n)$$

subject to the constraint $u_{ij}^n \in \vartheta$.

To speed up convergence, a standard coarse to fine pyramidal approach may be preferred. For example, an original image S may be composed of a set of 512×512 pixels. The image S may then be averaged down (sub-sampled or decimated) by taking, for example, every 4 adjacent pixels and replacing the block of four pixels with a single pixel having a value that represents an average of the four pixels. This results in an image set that is 256×256 pixels. The sub-sampling can be continued, yielding a subsequent reduced pixel set, or layer, comprising 128×128 pixels. This process may continue, with each resulting layer being an increasingly coarser version of the original image S. The final layer will be a set of only 2×2 pixels, and likely will be blurred. The process of sub-sampling or decimating to provide increasingly coarser details results in an image pyramid. The original image S represent the base of the image pyramid at 512×512 pixels, followed by layers of 256×256 pixels, 128×128 pixels, 64×64 pixels, and so on. Using this approach of an image pyramid allows for rapid convergence of the solution to the functional of Equation (5). The process starts by using the coarsest layer of the image pyramid, and running a number of iterations until a solution is achieved. The solution is then used to initialize the next finer layer of the image pyramid, resulting in less computation in order to arrive at a solution. The process continues until the finest layer (e.g., the original, full resolution, image set for S) is reached. As an alternative to the image pyramid, a full multi-grid method may be used.

The functional of Equation (5) has a Quadratic Programming (QP) form, since the penalty term is quadratic and the constraint is linear. If the set $\vartheta$ is convex, the overall problem is convex if and only if the Hessian of the functional Equation (5) is positive definite. In such a case, there is a unique local minimum that is also the global solution to the problem. In the above embodiment, the Hessian is given by $g*(1-\alpha\Delta)*g$, which is positive definite for all $\alpha>0$. Thus, for a convex target gamut $\vartheta$, there exists a unique solution.

Figure 3:
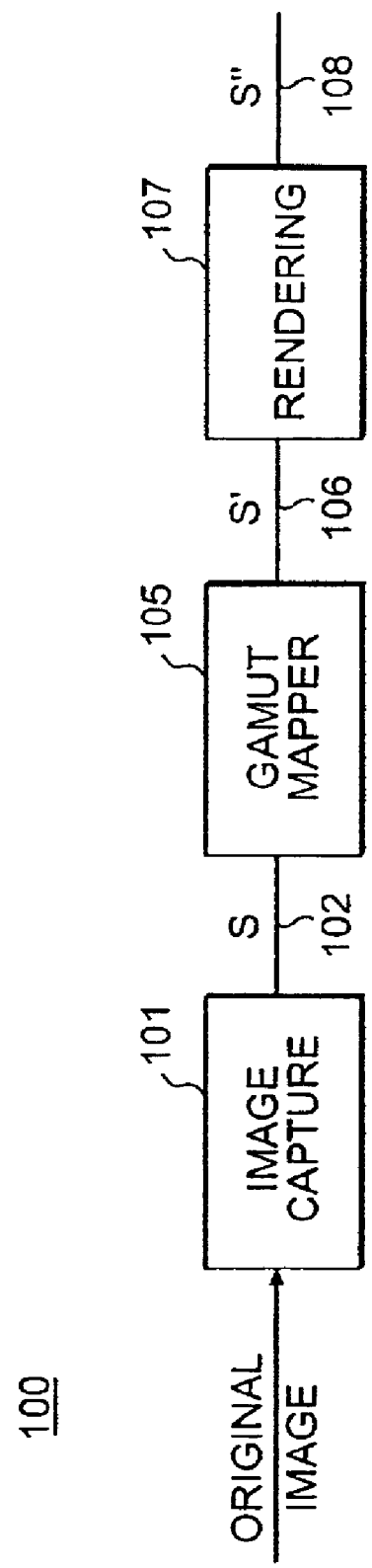
FIG. 3 is a block diagram of an apparatus that uses a variational approach for gamut mapping.

The above-described functional (Equation (5)) may be used in imaging devices to map a gamut of an image to the gamut of a device that attempts to reproduce the image. FIG. 3 is a block diagram of an apparatus 100 that may be used for gamut mapping according to the functional of Equation (5). An image capture device 101 receives an input original image and produces an output image S 102, which is an electrical signal representing a calorimetric value image. For example, the capture device 101 may convert at least three calorimetric values of each pixel of the original image into corresponding electrical signals. The electrical signals may indicate the L, a, b values, for example. Other calorimetric values may be the XYZ tristimilus value and the L, U, V or device dependent RGB values. A gamut mapper 105 produces an in-gamut image S' 106. Finally, a rendering module 107 provides a rendered image S" 108. The rendering module 107 may be implemented as a color laser printer. The thus-generated image S" 108 may represent a best-fit image, given gamut limitations of the device in which the image reproduction is to occur.

The gamut mapper 105 applies an algorithm to extract and map the values of the image S 102 into the gamut of the image reproduction device 107. In particular, the gamut mapper 105 may apply an algorithm that solves the problem represented by Equation (5), thereby solving the gamut mapping problem and optimizing the output image S" 108.

Figure 4:
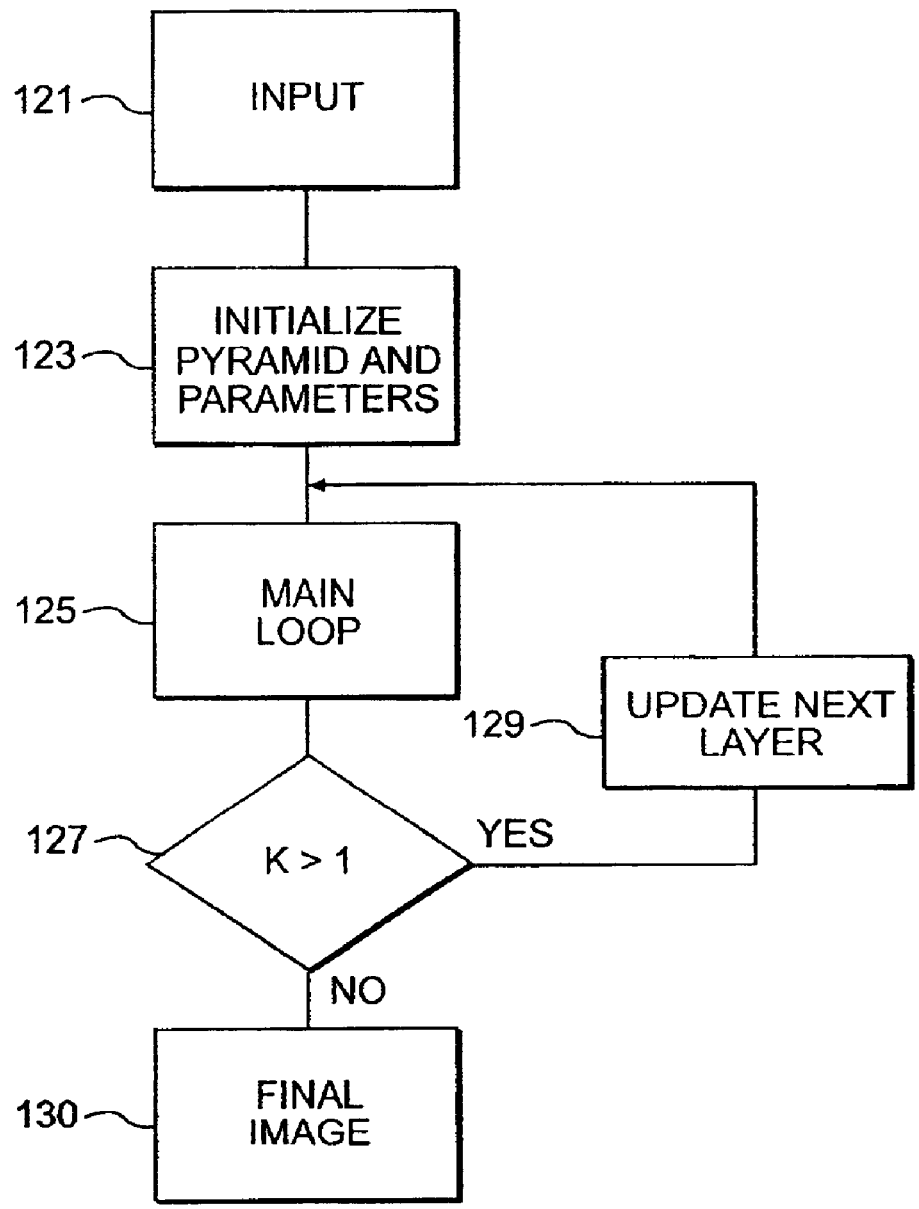
FIGS. 4–7 illustrate algorithms and processes used with the apparatus of FIG. 3.

FIG. 4 is a block diagram showing routines of an algorithm 120 that may be used to complete the gamut mapping function. In an embodiment, the algorithm 120 provides a numerical solution to the functional of Equation (5).

The algorithm 120 begins with input block 121, where an input to the algorithm 120 is an image S of size [N, M], and the two parameters $\alpha$ and $\beta$.

In initialization block 123, a Gaussian pyramid of the image s is computed. The thus-constructed pyramid contains p resolution layers (from fine (1) to coarse (p)) with the current reolution layer (k) set to p. In block 125, $T_k$ iterations of a gradient descent algorithm are applied to the $k^{th}$ resolution layer, until all resolution layers are checked, block 127. In block 129, the next resolution layer is updated. When all resolution layers are processed, the result is the final output image 130 of the algorithm 120.

Figure 5:
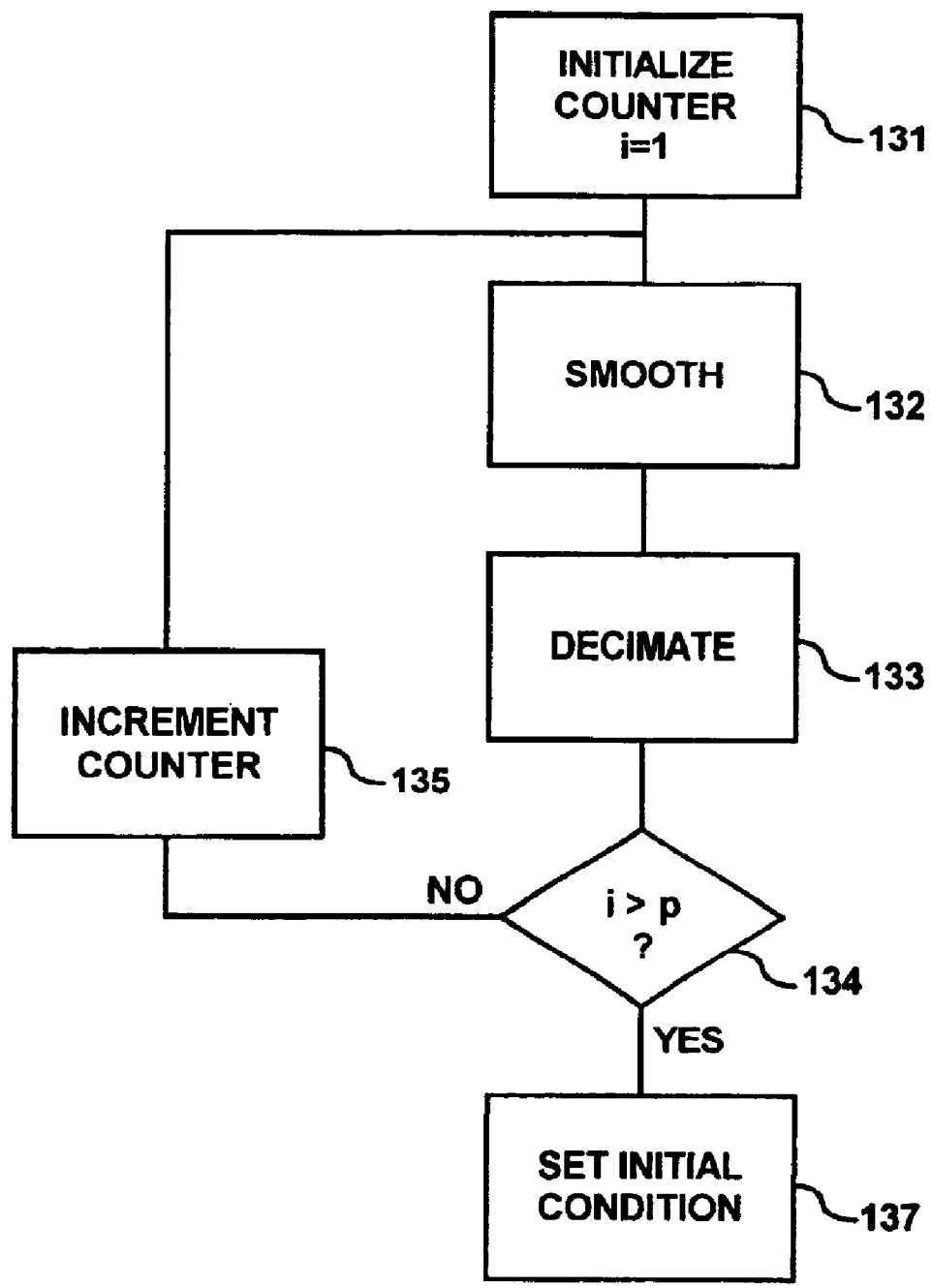

FIG. 5 is a block diagram showing the initialization routine 123 in more detail. In block 131, a counter is initialized with i=1. In block 132, the Gaussian pyramid is constructed by smoothing the image with a kernel, such as the kernel $k_{PYR}$:

$$K_{PYR} = \begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}$$

In block 133, the image is decimated by, for example, a 2:1 ratio. The process is repeated (block 134) and the counter is incremented (block 135) p times where $p<lg_2$ (min (M, N)). This process produces a sequence of images $\{S_k\}_{k=1}^P$ conventionally named the "Gaussian Pyramid of S." The image $S_1$ is the original image S, and $S_p$ is an image with the coarsest resolution for the Gaussian pyramid.

In block 137, the process sets k=p, i.e., starts at the coarsest resolution layer k, and sets the initial condition $L_0 = \max \{S_p\}$.

Figure 6:
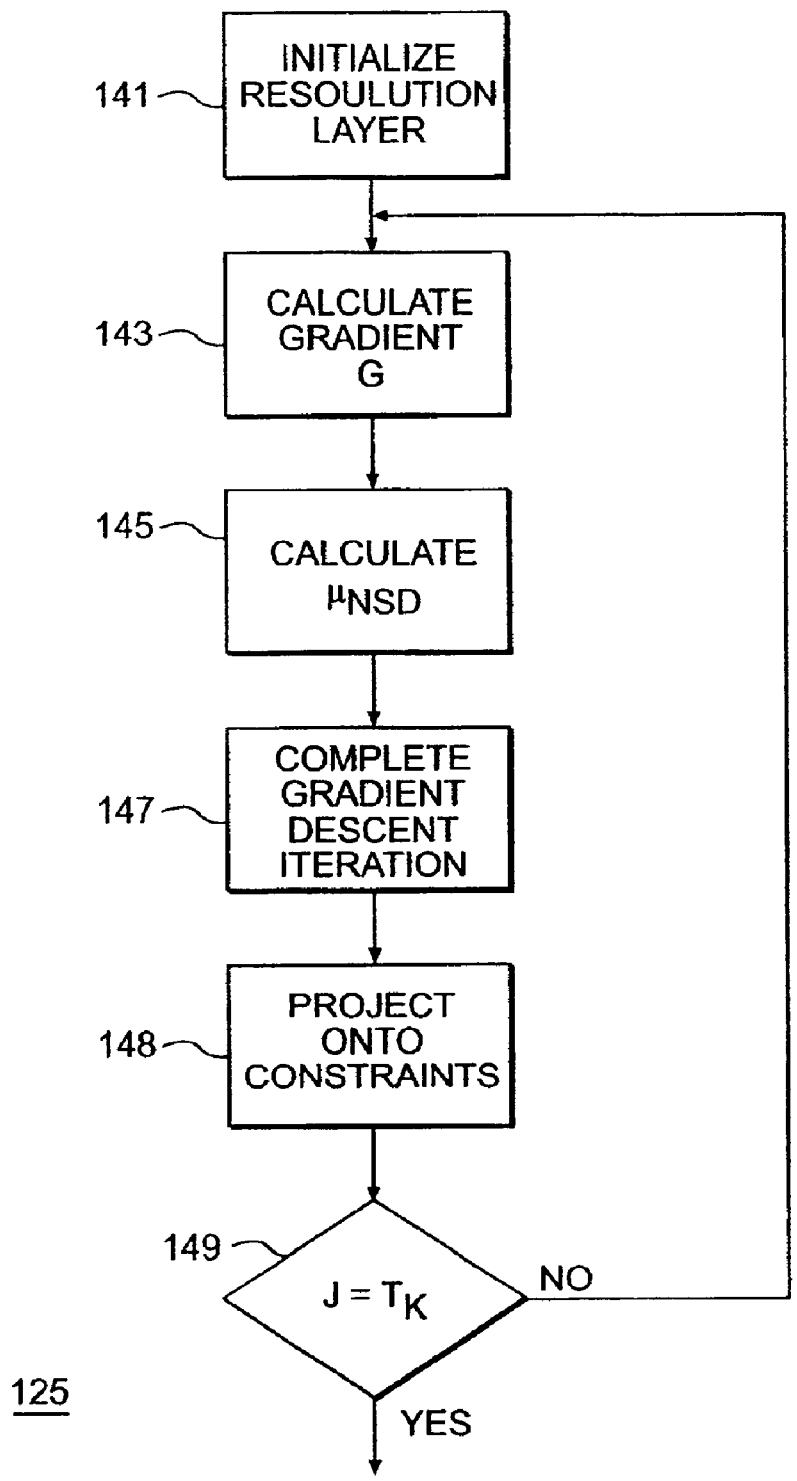

FIG. 6 is a block diagram of an embodiment of the processing main routine 125. The routine 125 starts at block 141, where the new resolution layer is initialized and $T_k$ and $\alpha_k$ are set (e.g., $T_k = K*T_0$).

Then, for j=1, ..., $T_k$.

In block 143, the routine 125 calculates the gradient:

$$G = \Delta(u-u_0) + \alpha_k(u-u_0)$$

where $\Delta x$ is the convolution of each of the color planes of x with $K_{LAP}$:

$$K_{LAP} = \begin{bmatrix} 0 & 1 & 0 \\ 1 & -2 & 1 \\ 0 & 1 & 0 \end{bmatrix}$$

and $\alpha_k$ is, for example $\alpha_k = \alpha*2^2(k-1)$

In block 145, the routine 125 calculates $\mu_{NSD}$:

$$\mu_{NSD} = \frac{\sum G^2}{(\sum (G*\Delta G) + \alpha_K \sum G^2)}$$

In block 147, the routine 125 completes the gradient descent iteration:

$$L_j = L_{j-1} - \mu_o' \mu_{NSD} \cdot G,$$

Where $\mu_o$ is a constant; for example $\mu_o=0.8$.

In block 148, the result is projected onto the constraints:

$$L_j = Proj_{pullout;zu502600.900}(L_j)$$

Where Proj$\vartheta$(x) is a projection of x into the gamut $\vartheta$.

In block 149, if j≠$T_K$, processing returns to block 143. Otherwise, the routine 125 ends.

Returning to FIG. 4, in block 127, if k>1, the result $L_{Tk}$ is up scaled (2:1 ratio) by pixel replication into the new $L_0$, the initialization for the next resolution k−1 layer. The resolution layer is updated k=k−1, and the algorithm proceeds by going again to block 125. If k=1, the result $L_{T1}$, is the final output of the algorithm 120.

Figure 7:
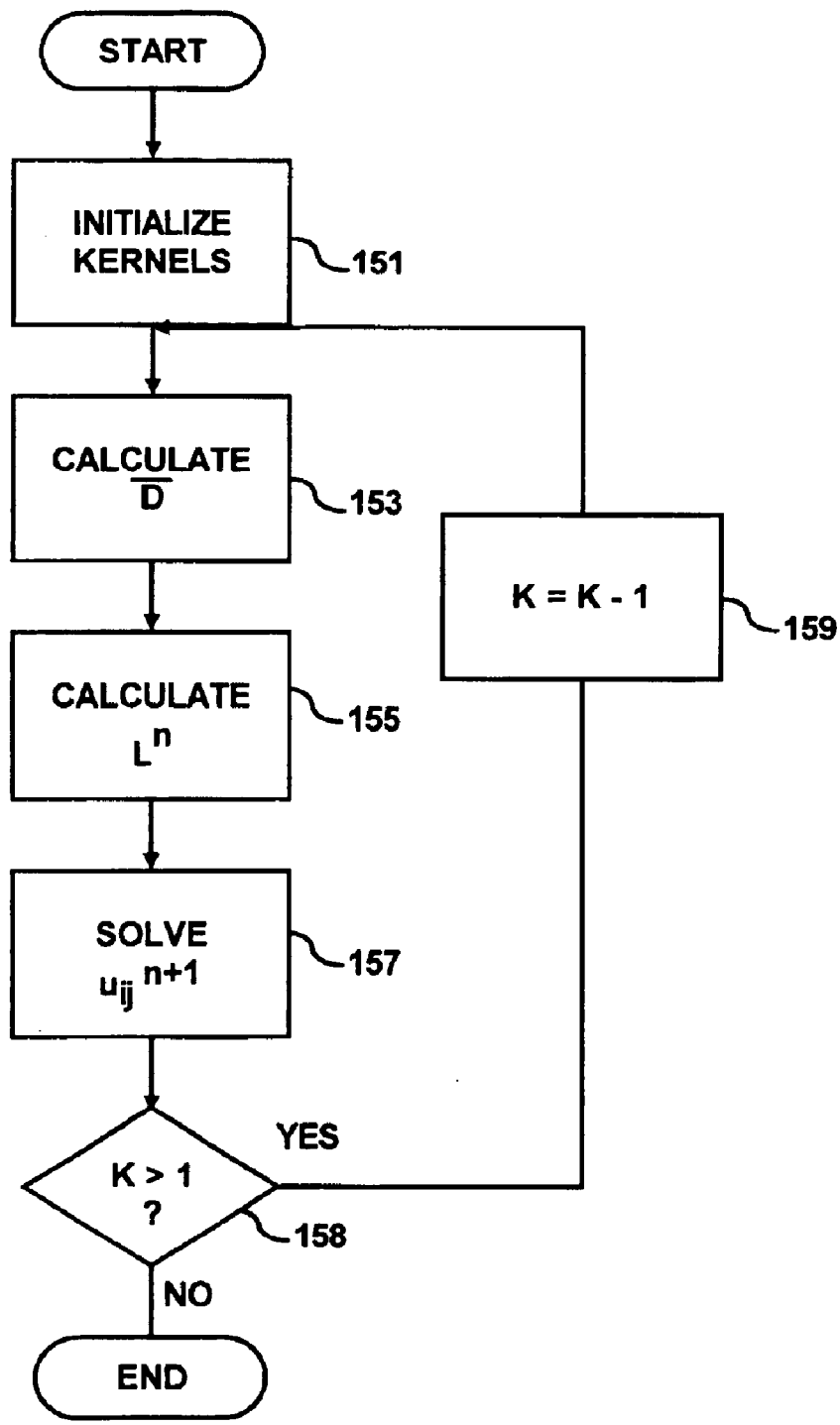

FIG. 7 is a block diagram of an alternative embodiment of an algorithm routine, denoted as 120a. The routine 120a may be applied to solve the equation:

$$u_{ij}^{n+1} = u_{ij}^n + \tau(\alpha L_{ij}^n - \overline{D_{ij}^n})$$

subject to the constraint $u_{ij}^n \in \vartheta$.

The routine 120a begins with block 151, where the kernels $D_2$ and g, and the counter k are initialized.

In block 153, the routine 120a calculates:

$$\overline{D^n} = g*g*(u^n - u_0).$$

In block 155, the routine 120a calculates:

$$L^n = D_2*(u^n - u_0).$$

In block 157, the routine 120a performs the gradient steps to solve $u_{ij}^{n+1}$ as noted above.

In block 158, the routine 120a determines if k>1, and if so, processing moves to block 159, where k is set to k−1. Processing then returns to block 153. Otherwise, the routine 120a ends.

Figure 8:
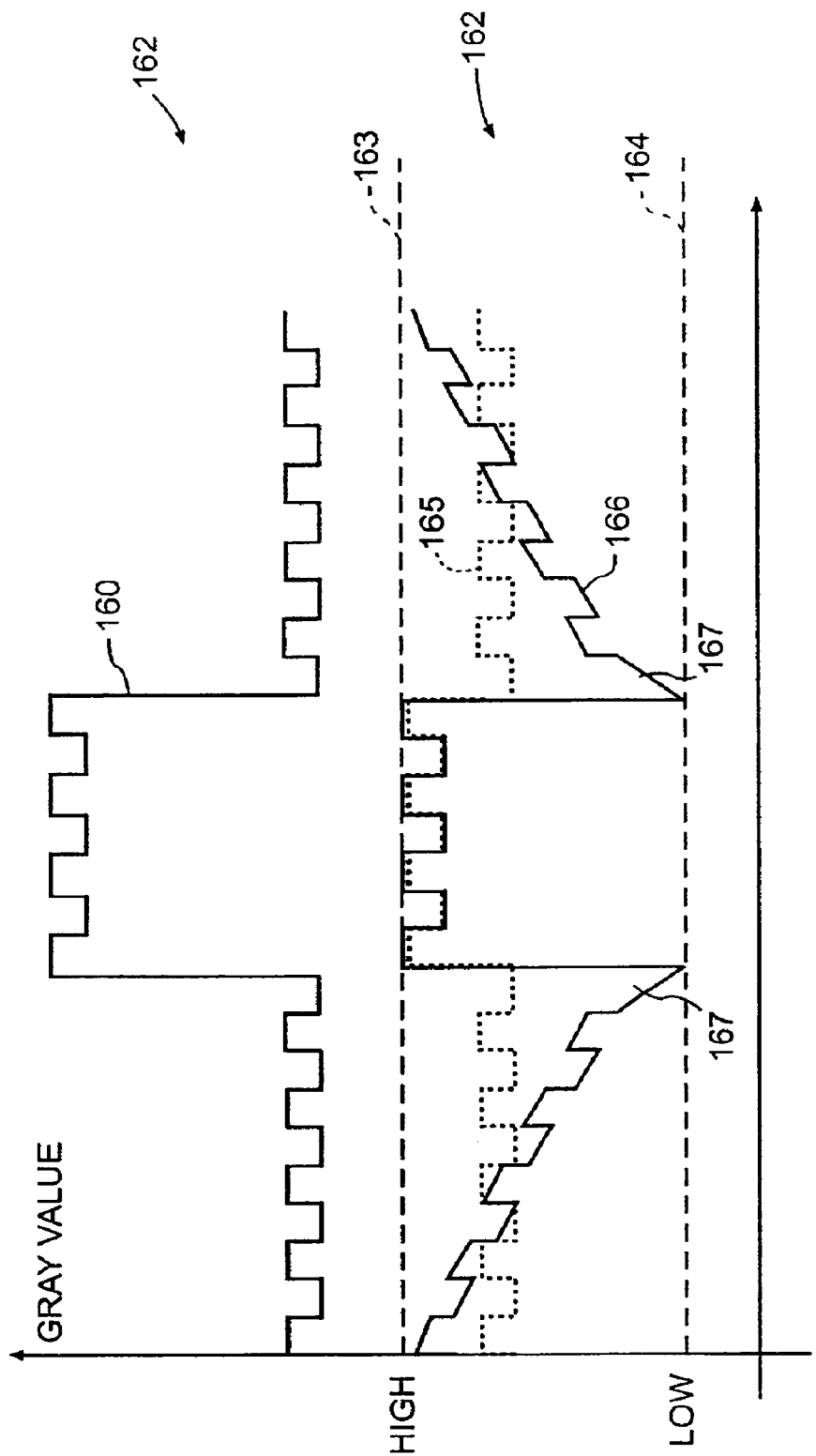
FIG. 8 illustrates an example of a behavior of an algorithm used by the apparatus of FIG. 3.

The penalty function as shown in Equation (5) tends to create halos in the resulting image. FIG. 8 explains the origin of those halos through a one dimensional example. FIG. 8 shows an original signal 160 that is outside of gamut 162 (delimited in the gray range by dotted lines 163 and 164). Projecting the signal 160 onto the gamut 162 will result in a constant value, denoted as "High" (163) and loss of all detail. FIG. 8 also shows the result of processing the original signal 160. Dashed line 165 represents the result of scaling the signal 160 into the allowed range of the gamut 162. All the details are preserved, but with a smaller contrast. As opposed to point operations, the space dependent approach represented by Equation (5) yields a signal 166 (the solid line) that preserves the details with high contrast. However, halos occur near strong edges 167, which means that near the edges 167 there is a slow transition from low to high values.

In order to avoid these phenomena, the penalty term may be modified, and robust estimation tools may be used. The original penalty term in Equation (5) may be replaced by:

$$E(u) = \int_\Omega (\rho_1(D) + \alpha\rho_2(|\nabla D|))d\Omega. \tag{8}$$

which for $\rho_1(x) = \rho_2(x) = x^2$ coincides with Equation (5). If the function ρ(x) grows slower than $x^2$ as x $\vartheta\infty$, behavior near strong edges improves. Good candidates for ρ(x) are ρ(x)= |x| or $\rho(x) = \sqrt{1+x^2}$.

A different and simpler (linear) approach with similar robust behavior involves solving the original Equation (5) twice, with two different values of α. A solution with a small a may be denoted as $u_{small}$ and a solution that corresponds to the high value of a may be denoted as $u_{high}$. The solution $u_{small}$ has smaller contrast at areas with small details, yet has almost no halos. On the other hand, the solution $u_{high}$ preserves the small details, but at the expense of strong halo effects. By averaging these two results ($u_{small}$ and $u_{high}$) in a spatially adaptive way provides a simple, improved solution. The improved solution is therefore:

$$u_{final}[k,j] = w[k,j]u_{small}[k,j](1-w[k,j])u_{high}[k,j]$$

The weight w[k,j] should be close to one near strong edges, and close to zero in relatively smooth regions. In an embodiment, $$w[k, j] = \frac{1}{1 + \beta|\nabla g * u_0|^2}$$

provides a robust estimation.

Halo problems have been recently dealt with in relation to Dynamic Range Compression. Solutions proposed included anisotropic diffusion and robust filtering. The halo-related solutions described herein are solutions to the same halo problem.

Figure 9:
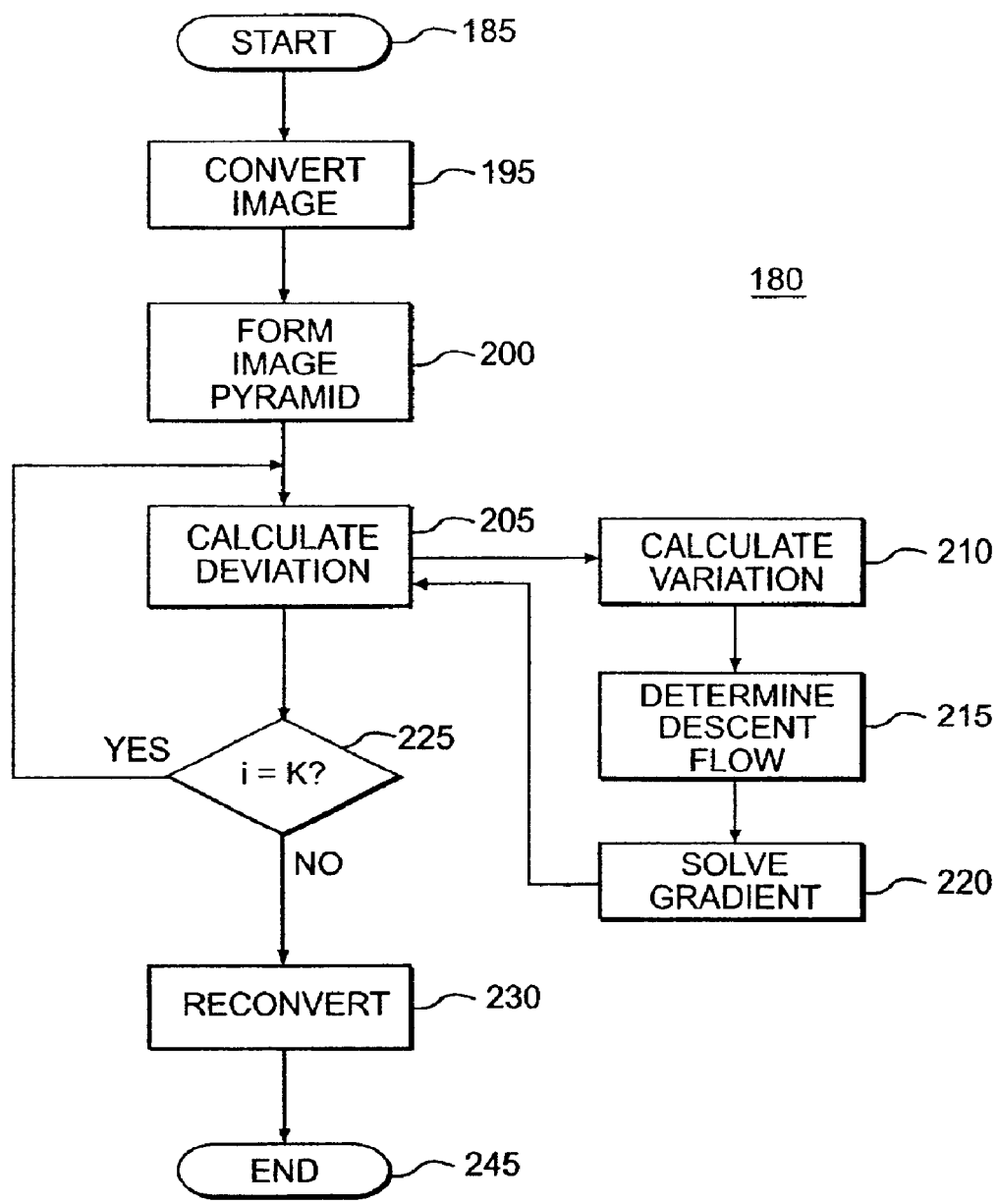
FIG. 9 is a flowchart of an algorithm illustrating an alternative operation of the apparatus of FIG. 3.

FIG. 9 is a flowchart showing an operation 180 of the gamut mapper 105. The process begins in start block 185. In converter block 195, the raw image S is converted from electrical signals having arbitrary values (calorimetric values) to locally defined color descriptors.

In block 200, the converted image signal is decimated to form an image pyramid. A 2:1 decimation scheme may be used, for example. Subsequent steps in the operation 180 begin with the coarsest resolution layer of the image pyramid using a space varying algorithm. In block 205, the gamut mapper 105, using a space varying algorithm such as that represented by Equation (5) calculates the image deviation for the coarsest resolution layer. This process may involve calculating a first variation (block 210), determining a gradient descent flow (block 215), and solving the resulting gradient subject to a constraint (block 220). In block 225, a determination is made if the current resolution layer is the last (finest) resolution layer. If additional layers remain for processing, the process 180 returns to block 205. Otherwise, the process 180 moves to block 230, where local color descriptors are converted to the required output format. In block 245 the process 180 ends.

Figure 10:
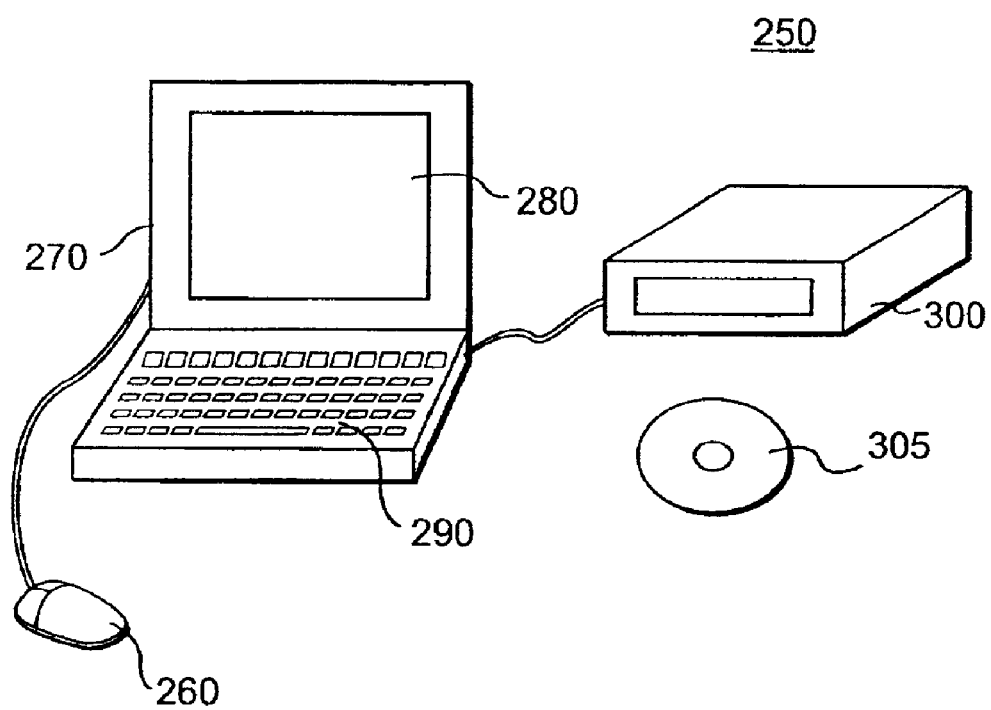
FIG. 10 is a block diagram of a computer system that implements the algorithm of FIG. 4.

The above-described space-varying algorithm 120, as represented by Equation (5), for example may be executed using a general purpose computer system 250 as shown in FIG. 10. The computer system 250 includes an input device 260, a computer unit 270, a display 280, a keyboard 290, and a storage device 300. The storage device 300 may be a CD-ROM drive, for example. Program code instructions for executing the algorithms 120, 120a and 180 may be stored on a CD-ROM 305, or other computer readable memory, which is read by the storage device 300. The program code read out of the CD-ROM 305 are executed by a CPU of the computer unit 270. The CPU may perform the processing shown by the flowchart of FIG. 9. The algorithms 120, 120a, and 180 also may be performed in a camera or printer hardware.

What is claimed is:

1. A method for gamut mapping of an input image using a space varying algorithm, comprising:

receiving the input image;

converting the color representations of an image pixel set to produce a corresponding electrical values set;

applying the space varying algorithm to the electrical values set to produce a color-mapped value set;

reconverting the color-mapped value set to an output image; and wherein the space varying algorithm minimizes the following variational problem:

$$E(u) = \int_\Omega (D^2 + \alpha |\nabla D|^2) d\Omega,$$

subject to $u \in \vartheta$, wherein $\Omega$ is a support of the input image, $\vartheta$ is the target gamut, $\alpha$ is a non-negative real number, $D=g*(u-u_0)$, g is a normalized Gaussian kernel with zero mean and a small variance $\sigma$, u0 is the input image, and u is the output image.

2. The method of claim 1 further comprising:
solving the variational problem at a high value of $\alpha$;
solving the variational problem at a low value of $\alpha$; and
averaging the solutions.

3. The method of wherein the step of averaging the solutions comprises using a spatially adaptive weighting scheme, comprising:

$$u_{final}[k,j] = w[k,j] u_{small}[k,j](1-w[k,j]) u_{high}[k,j],$$

wherein the weight w[k,j], comprises:

$$w[k,j] = \frac{1}{1+\beta|\nabla g*u_0|^2}, \text{ and}$$

wherein $\beta$ is a non-negative real number.

4. The method of claim 1, wherein the variational problem is solved according to:

$$\frac{du}{dt} = \alpha g * \Delta D - g * D,$$

subject to $u \in \vartheta$.

5. The method claim 1, wherein the space varying algorithm is solved according to:

$$u_{ij}^{n+1} = u_{ij}^n + \tau(\alpha L_{ij}^n - \overline{D_{ij}^n}),$$

subject to $u_{ij}^n \in \vartheta$, wherein $\tau = dt,$ $D^n = g*g*(u^n - u_0)$ $L^n = D_2*(u^{n-u}_0)$ and $D_2 = g_x * g_x + g_y * g_y.$ 6. A method for gamut mapping of an input image using a space varying algorithm, comprising:
receiving the input image;
converting the color representations of an image pixel set to produce a corresponding electrical values set;
applying the space varying algorithm to the electrical values set to produce a color-mapped value set;
reconverting the color-mapped value set to an output image; and
wherein the space varying algorithm minimizes the following variational problem:

$$E(u) = \int_\Omega (\rho_1(D) + \alpha \rho_2(|\nabla D|)) d\Omega,$$

subject to $u \in \vartheta$, wherein $\rho_1$ and $\rho_2$ are scalar functions, $\Omega$ is a support of the image, $\vartheta$ is the target gamut, $\alpha$ is a non-negative real number, $D=g*(u-u_0)$, g is a normalized Gaussian kernel with zero mean and a small variance $\sigma$, $u_0$ is the input image, and u is the output image.

7. The method of claim 1, further comprising:
decimating the input image to create one or more resolution layers, wherein the one or more resolution layers comprises an image pyramid; and
solving the variational problem for each of the one or more resolution layers.

8. The method of claim 1, wherein the method is executed in at least one of a camera and a printer.

9. The method of claim 6, wherein the method is executed in at least one of a camera and a printer.

10. A computer-readable memory for color gamut mapping, comprising an instruction set for executing color gamut mapping steps, the steps, comprising:
converting first colorimetric values of an original image to second colorimetric values, wherein output values are constrained within a gamut of the output device; using a space varying algorithm that solves an image difference problem; and
optimizing a solution to the image difference problem, wherein the image difference problem is represented by:

$$E(u) = \int_\Omega (D^2 + \alpha |\nabla D|^2) d\Omega$$

subject to $u \in \vartheta$, wherein is a support of an input image, $\alpha$ is a non-negative real number, $\vartheta$ is the target gamut, $D=g*(u-u_0)$, g is a normalized Gaussian kernel with zero mean and small variance $\sigma$, $u_0$ is the input image, and u is an output image.

11. The computer-readable memory of claim 10, wherein the instruction set further comprises steps for:
solving the image difference problem at a high value of $\alpha$;
solving the image difference problem at a low value of $\alpha$; and
averaging the solutions.

12. The computer-readable memory of claim 11, wherein averaging the solutions comprises using a spatially adaptive weighting scheme, comprising:

$$u_{final}[k,j] = w[k,j] u_{small}[k,j](l-w[k,j]) u_{high}[k,j],$$

wherein the weight w[k,j], comprises:

$$w[k,j] = \frac{1}{1+\beta|\nabla g*u_0|^2}, \text{ and}$$

wherein $\beta$ is a non-negative real number.

13. A computer-readable memory for color gamut mapping, comprising an instruction set for executing color gamut mapping steps, the steps, comprising:
converting first colorimetric values of an original image to second colorimetric values, wherein output values are constrained within a gamut of the output device; using a space varying algorithm that solves an image difference problem; and optimizing a solution to the image difference problem, wherein the image difference problem is represented by:

$$E(u) = \int_\Omega (\rho_1(D) + \alpha\rho_2(|\nabla D|))d\Omega,$$

wherein $\rho_1$ and $\rho_2$ are scalar functions.

14. A computer-readable memory for color gamut mapping, comprising an instruction set for executing color gamut mapping steps, the steps, comprising:
converting first colorimetric values of an original image to second colorimetric values, wherein output values are constrained within a gamut of the output device; using a space varying algorithm that solves the following variational problem:

$$E(u) = \int_\Omega (D^2 + \alpha|\nabla D|^2)d\Omega,$$

subject to $u \in \vartheta$, wherein $\Omega$ is a support of the input image, $\vartheta$ is the target gamut, $\alpha$ is a non-negative real number, $D=g^*(u-u_0)$, g is a normalized Gaussian kernel with zero mean and a small variance $\sigma$, $u_0$ is the input image, and u is the output image; and
wherein the instruction set further comprises steps for:
decimating the input image to create one or more resolution layers, wherein the one or more resolution layers comprise an image pyramid; and
solving the variational problem for each of the one or more resolution layers.

15. The computer-readable memory of claim 14, wherein the instruction set further comprises steps for:
(a) initializing a first resolution layer;
(b) calculating a gradient G for the resolution layer, the gradient G comprising:
G=Δ(u−u_0)+α_k(u−u_0 ), wherein Δx is a convolution of each color plane of x with $$K_{LAP} = \begin{bmatrix} 0 & 1 & 0 \\ 1 & -2 & 1 \\ 0 & 1 & 0 \end{bmatrix}$$

and $\alpha_k=\alpha_0*2^{2(k-1)}$, wherein $K_{LAP}$ is a Laplacian kernel, k is a kernal, and $\alpha_0$ is an initial non-negative real number:
(c) calculating an iteration layer value $L_j=L_{j-I}-\mu_0 * \mu_{NSD} *$ G, wherein $\mu_0$ is a constant, j is a specific resolution layer, and $\mu_{NSD}$ is a normalized steepest descent parameter;
(d) projecting the value onto constraints $\text{Proj}\vartheta(L_j)$, wherein $\text{Proj}\vartheta(x)$ is a projection of x into a gamut $\vartheta$; and
(e) for a subsequent resolution layer, upscaling from one resolution layer to another and repeating steps (b)–(d).

16. A method for image enhancement using gamut mapping, comprising:
receiving a input image;
from the input image, constructing an image pyramid having a plurality of resolution layers;
processing each resolution layer, wherein the processing includes completing a gradient iteration, by:
calculating a gradient G, for G=Δ(u−u_0)+α_k(u−u_0), wherein u is the iterated image, $u_0$ is the input image at the appropriate resolution layer, and α is a non-negative real number;
completing a gradient descent iteration; and
projecting the completed gradient descent iteration onto constraints; and computing an output image using the processed resolution layers.

17. The method of claim 16, wherein completing the gradient descent iteration ($L_j$) comprises calculating:

$$\mu_{NSD} = \frac{\sum G^2}{(\sum(G*\Delta G) + \alpha_k \sum G^2)};$$

and $$L_j = L_{j-I} - \mu_0 \cdot \mu_{NSD} \cdot G,$$

wherein $\mu_{NSD}$ is a normalized steepest descent parameter, $\mu_0$ is a constant, k is a number of resolution layers in the image pyramid, and j is a specific resolution layer.

18. The method of claim 16, wherein projecting the completed gradient descent iteration onto the constraints is given by:

$$L_j = \text{Proj}_a(L_j),$$

wherein $\text{Proj}_a(x)$ is a projection of x into a gamut $\vartheta$.

19. The method of claim 16, wherein constructing the image pyramid, comprises:
smoothing the input image with a Gaussian kernel;
decimating the input image; and
setting initial condition $L_0$ max {Sp}, wherein Sp is an image with the coarsest resolution layer for the image pyramid.

20. The method of claim 19, wherein the Gaussian kernel, comprises:

$$K_{PYR} = \begin{bmatrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{bmatrix}.$$

21. The method of claim 16, wherein processing each resolution layer further comprises applying a space varying algorithm to minimize the following variational problem:

subject to $u \in \vartheta$, wherein $\Omega$ is a support of the image, $\vartheta$ is the target gamut, and $D=g^*(u-u_0)$, wherein g is a normalized Gaussian kernel with zero mean and small variance $\sigma$, $u_0$ is the input image, u is the output image, and wherein $\alpha$ is a non-negative real number.

22. The method of claim 16, wherein processing each resolution layer comprises applying a space varying algorithm to minimize a variational problem represented by:

$$E(u) = \int_\Omega (\rho_1(D) + \alpha\rho_2(|\nabla D|))d\Omega,$$

subject to $u \in \vartheta$, wherein and $\rho_1$ and $\rho_2$ are scalar function.

23. The method of claim 22, wherein ρ1 and ρ2 are chosen from the group comprising $\rho(x)=|x|$ and $\rho(x)=\sqrt{1+x^2}$.

* * * * *